(12) United States Patent
Karushev et al.

(10) Patent No.: US 12,381,231 B2
(45) Date of Patent: Aug. 5, 2025

(54) CATHODE FOR METAL-AIR CURRENT SOURCES AND METAL-AIR CURRENT SOURCE WITH SUCH CATHODE

(71) Applicant: POWERMERS INC., Westerville, OH (US)

(72) Inventors: Mikhail P. Karushev, St. Petersburg (RU); Svetlana A. Belous, St. Petersburg (RU); Tatiana S. Lavrova, St. Petersburg (RU); Irina A. Chepurnaia, St. Petersburg (RU); Aleksandr M. Timonov, St. Petersburg (RU); Semyon Kogan, Newton, MA (US)

(73) Assignee: POWERMERS SMART INDUSTRIES INC., Columbus, OH (US)

( * ) Notice: Subject to any disclaimer, the term of this patent is extended or adjusted under 35 U.S.C. 154(b) by 297 days.

(21) Appl. No.: 15/275,527

(22) Filed: Sep. 26, 2016

(65) Prior Publication Data

US 2017/0012293 A1 Jan. 12, 2017

Related U.S. Application Data

(63) Continuation of application No. PCT/US2015/058738, filed on Nov. 3, 2015.

(30) Foreign Application Priority Data

Sep. 15, 2014 (RU) ........................ RU2014137372

(51) Int. Cl.
*H01M 4/90* (2006.01)
*H01M 12/08* (2006.01)

(52) U.S. Cl.
CPC ....... *H01M 4/9008* (2013.01); *H01M 4/9083* (2013.01); *H01M 12/08* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 6,795,293 B2 * | 9/2004 | Timonov | H01G 9/22 |
| | | | 252/62.2 |
| 7,382,603 B2 | 6/2008 | Timonov et al. | |

(Continued)

FOREIGN PATENT DOCUMENTS

| | | |
|---|---|---|
| RU | 28790 U1 | 4/2003 |
| RU | 2236067 C2 | 9/2004 |

(Continued)

OTHER PUBLICATIONS

International Preliminary Report on Patentability from PCT/US2015/058738 dated Mar. 21, 2017.

*Primary Examiner* — Eli S Mekhlin
(74) *Attorney, Agent, or Firm* — Erickson Law Group, PC

(57) ABSTRACT

The invention is related to a metal-air current source and to its cathode. The cathode includes a base made of porous current-conducting material, permeable for molecular oxygen, to whose operating surface is applied a polymer complex compound of transition metal with the Schiff base, having a stack structure, in which the separate fragments of the said polymer compound are connected to each other through the donor-acceptor interaction, for example the compound of poly-[M(R,R'-Salen)], poly-[M(R,R'-Saltmen)] or poly-[M(R,R'-Salphen)] type.

11 Claims, 4 Drawing Sheets

(56) References Cited

U.S. PATENT DOCUMENTS

| | | |
|---|---|---|
| 7,563,354 B2 | 7/2009 | Timonov et al. |
| 9,178,254 B2 | 11/2015 | Lee et al. |
| 2004/0057191 A1 | 3/2004 | Timonov et al. |
| 2005/0217998 A1 | 10/2005 | Timonov et al. |
| 2007/0065719 A1 | 3/2007 | Timonov et al. |
| 2012/0141889 A1 | 6/2012 | Lee et al. |
| 2014/0127596 A1* | 5/2014 | Sun .................. H01M 12/06 429/406 |
| 2014/0295291 A1* | 10/2014 | Kondo ............... H01M 4/8668 429/403 |
| 2016/0308220 A1* | 10/2016 | Qi ..................... H01M 4/8647 |

FOREIGN PATENT DOCUMENTS

| | | |
|---|---|---|
| RU | 2575194 C1 | 2/2016 |
| WO | 03/065536 A2 | 8/2003 |
| WO | 2013049460 A1 | 4/2013 |

\* cited by examiner

CATHODE FOR METAL-AIR CURRENT SOURCES AND METAL-AIR CURRENT SOURCE WITH SUCH CATHODE

CROSS REFERENCE TO RELATED APPLICATIONS

This application is a continuation, claiming priority to International Patent Application No. PCT/US2015/058738, filed on Nov. 3, 2015, which claims priority to and the benefit of Russian Patent Application No. RU2014137372, filed on Sep. 15, 2014, the entire disclosures of each of which are incorporated by reference herein.

FIELD OF THE INVENTION

This invention is related to electrochemical current sources, namely metal-air sources, and in particular to lithium-air current sources and their electrodes, and can be used for the development of various energy storage devices, for example batteries.

BACKGROUND OF THE INVENTION

Metal-air current sources usually comprise an anode made of an active metal, and an air-permeable, more precisely a molecular oxygen-permeable cathode, separated by an electrolyte containing ions of the metal from which the anode is made. The cathode is made in the form of a porous electrically conducting structure with a highly developed surface, made as a rule of carbon materials, on whose surface occur reactions of reduction and evolution of molecular oxygen from metal oxide (peroxide) in the process of charge-discharge of the current source.

In particular when lithium is the anode metal in so-called lithium-air current sources, the electrochemical processes that occur are described as follows.

During discharge of the lithium-air current source, lithium oxidation takes place on the anode, from which the lithium ions transit to an electrolyte, while electrolytic reduction of molecular oxygen coming from the atmospheric environment through the porous cathode to the cathode-electrolyte interface occurs on the cathode. Electrochemical reactions occurring in such system during the discharge are described as follows:

on the anode: $Li-e=Li^+$, on the cathode: $O_2+4Li^++4e=2Li_2O$ or $2Li^++O_2+2e=Li_2O_2$.

During charging of this current source, oxygen contained in lithium oxide oxidizes on the cathode to molecular oxygen and returns back into the atmosphere. Lithium ions are reduced to metallic lithium on the anode. Electrochemical reactions occurring in this system during the charging are described as follows:

on the cathode: $2Li_2O-4e=4Li^+$ or $Li_2O_2-2e=2Li^++O_2$.

on the anode: $Li^++e=Li$.

Lithium-air current sources are unique in their characteristics because the cathode-active material, oxygen, is not stored in the source, but comes from the atmospheric environment. The lithium-air current source has an open circuit voltage ($V_{oc}$) of about 2.91 V, and its theoretical calculated specific energy is 11,140 Wh/kg [K. M. Abraham. A Brief History of Nonaqueous Metal-Air Batteries//ECS Transactions, 3 (42) 67-71 (2008)]. Such current sources can be used, for example, in the manufacturing of batteries for electric vehicles where rechargeable current sources having a service life of at least 1,000 charge-discharge cycles and a specific power of at least 400 W/kg are required.

Various metal-air current sources are known. Thus, in patent U.S. Pat. No. 5,510,209 a metal-air current source (battery) is described that comprises a metallic anode, a composite carbon cathode, and an electrolyte with high ionic conductivity, disposed in the form of polymer film between the anode and cathode, on which the processes of reduction and evolution of molecular oxygen during discharging and charging respectively take place. It was proposed that the anode metal be a metal such as lithium, magnesium, sodium, calcium, aluminum, or zinc. This current source has a sufficiently high value of specific energy of about 3,500 Wh/kg (in relation to cathode weight), but has a low value of discharge current density of approximately 0.1 to 0.25 $mA/cm^2$, i.e. it has very low specific power.

The above features are due to the low rate of electrochemical reactions occurring on the cathode due to the high energy of activation of these processes. Accordingly, a considerable number of inventions known from the prior art involve various cathode improvements that are intended to have the required effect on the electrochemical properties of such current sources.

In particular, in order to increase the rate of said reactions, and thus to increase the specific power of metal-air current sources on the cathode surface where the reduction of molecular oxygen and the evolution of molecular oxygen from metal oxide (peroxide) in the process of the current source discharge-charge directly take place, a catalyst is applied in one way or another.

Thus a cathode for a lithium-air current source is known that was described in patent application KR 20140056544, said cathode consisting of manganese dioxide with additions of nanoparticles of noble metals (platinum, palladium, ruthenium, iridium, and gold) applied to a nickel mesh. However, the use of precious metals in the cathode material results in a significantly higher cost of the electrode and the current source in which it is used.

A cathode for a lithium-air current source is known that was described in patent application WO 2013174770, said cathode consisting of two layers: a layer contacting the ambient air and containing catalysts of oxygen electroreduction (manganese, silver, platinum), and a layer contacting the electrolyte, which contains catalysts (cobalt or nickel oxides) of electrooxidation of oxygen compounds of lithium. Such two-layer structures are usually characterized by high electrical resistance on the layer interface, which results in an increase in the internal resistance of the current source, and deteriorates its electrical characteristics.

Various metal-air current sources are known in which cathodes containing catalysts are also described.

Thus patent U.S. Pat. No. 7,087,341 describes a metal-air current source containing an anode and a cathode, said cathode comprising a gas diffusion layer, a current collector, and a layer with a catalyst containing carbon particles, the average size of which does not exceed 10 µm, and catalyst particles. As the catalyst, manganese oxide, cobalt oxide, and nickel oxide were proposed. During testing of a laboratory electrochemical cell modeling such a current source, in particular with a mixture of Ni(II) oxide and Co(II) oxide as the catalyst promoting oxygen reduction, the following values were obtained: specific power—35 W/kg, specific energy—80 Wh/kg. The number of charge-discharge cycles did not exceed 30. It is obvious that this catalyst does not provide the required high operating characteristics of a current source.

A lithium-air current source is known that is described in patent CN 102240574, which consists of a lithium anode, a carbon cathode containing oxygen reaction catalysts, a separator, and an organic electrolyte. As a catalyst, complexes of cobalt and manganese with pyridine, 4,4'-bipyridine, pyrazine, and pyrrole are used on the cathode. Monomer complexes used as catalysts are mixed with carbon material in the process of cathode manufacturing and are adsorbed on the latter. However, in the process of storage and operation of the current source, catalyst molecules weakly bound to the carbon material may dissolve in the electrolyte, with the result that the efficiency of the catalyst will decrease from one charge-discharge cycle to the next.

A lithium-air current source is known that is described in patent application US 20120141889 and consists of a lithium anode, a carbon cathode containing traditional oxygen reaction catalysts, for example noble metals, a separator, and an organic electrolyte, in which a metal complex, for example ferrocene, is dissolved. The role of said complex, according to the inventors of this current source, lies in the fact that it can be subjected to oxidation on the cathode, and then oxidize the product of oxygen electroreduction, for example lithium oxide or peroxide, which must have positive impact on system reversibility. At the same time, the oxidized metal complex, in the event of its penetration through a porous separator to the anode, may oxidize the lithium, which will result in accelerated battery failure.

A lithium-air current source is known that is described in patent application US 20130157150 and consists of a lithium anode, a carbon cathode, a separator, and an organic electrolyte. For selective delivery of molecular oxygen from the air to the cathode, a membrane made of a porous permeable base is used, onto which membrane a layer of a polyalkyleneimine-cobalt complex is applied. Selectivity of the system is based on the capacity of said complex to reversibly bind molecular oxygen. However, this complex does not have catalytic activity in relation to oxygen reaction on the cathode, so that the latter also includes an oxygen reaction catalyst (noble metal compounds, transition metal compounds) applied to a porous carbon carrier.

A lithium-air current source is known that is described in patent application JP 201303721 and consists of a lithium anode, a carbon cathode containing traditional catalysts of oxygen reaction, for example, noble metals, a separator, and an organic electrolyte, wherein for selective delivery of molecular oxygen from air to cathode, a membrane is used that is made of a porous permeable base onto which is applied a layer of a cobalt complex compound with one of the following ligands: porphyrins, phthalocyanines, and Schiff bases. Selectivity of the membrane is based on the capacity of these complexes to bind molecular oxygen. The rate of oxygen delivery through such membranes is rather low, however, and provides a current density during battery discharge of around 10 µA/cm$^2$. It should be noted that in this case the complex compound, particularly with a Schiff base, does not directly participate in charge-discharge processes of the current source, but is used for imparting preferential oxygen selectivity to the membrane.

As we can see from the prior art, at the present time metal-air current sources, in particular the best of them, i.e. lithium-air current sources, have a service life of a few dozen charge-discharge cycles at a best specific power of no more than a few dozen W/kg. In sum, while in principle they have enormous potential in terms of service life and specific energy, metal-air current sources developed up until now do not have characteristics sufficient for their practical use in the automobile industry, for example. At the same time, it should be acknowledged that the electrical parameters of such current sources greatly depend on the electrochemical properties of the cathode.

DISCLOSURE OF INVENTION

A group of inventions is claimed: a cathode and a metal-air current source in which said cathode is used, which form a single inventive concept—to achieve the possibility of creating metal-air current sources with improved characteristics of specific energy, specific power, and number of charge-discharge cycles.

One of the objects of the invention is a cathode for metal-air current sources, including a base of porous electrically conductive material, permeable to molecular oxygen, onto whose operating surface a polymer complex compound of a transition metal with a Schiff base is applied.

The use of such cathode in a metal-air current source, whose composition also includes an anode and an electrolyte separating both electrodes and comprising ions of active metal from which the anode is made, yields the following result. Each fragment of said polymer complex compound of the transition metal with a Schiff base acts as a highly efficient reaction center capable of concentrating the molecular oxygen coming through the porous cathode base and metal ions coming from the electrolyte. The result of coordination of all components of the oxygen reduction process on the reaction center of such a catalyst is to decrease the energy consumption for this reaction and to increase its speed, which provides an increase in specific energy and specific power of the current source as an energy storage system.

One of the reasons for the limitation of service life (the number of charge-discharge cycles) of metal-air current sources is blockage of the surface of the catalyst applied to the cathode by large nonconductive and insoluble crystals of the active metal oxide and peroxide. The complex compound of a transition metal with a Schiff base used in this invention, which, as disclosed by the authors of the invention, acts in this system as a catalyst, consists of discrete reaction centers in which nanocrystalline products of oxygen electroreduction are formed. Oxide (peroxide) nanocrystals are reversibly oxidized during charging of the current source, which makes it possible to obtain a large number of charge-discharge cycles of the system.

It is preferable to use porous carbon material with a developed surface as the material of the cathode base. Carbon materials have a low density (specific weight), sufficient mechanical strength, and a high degree of surface development, which is easily varied by known methods, and at the same time they are chemically inert and have good adhesion to the polymer complex compound proposed for use according to this invention.

As the polymer complex compound of a transition metal with a Schiff base, which it is proposed to be applied to the operating surface of the cathode base, a compound of the poly-[M(R,R'-Salen)] type may be used, which has the structure

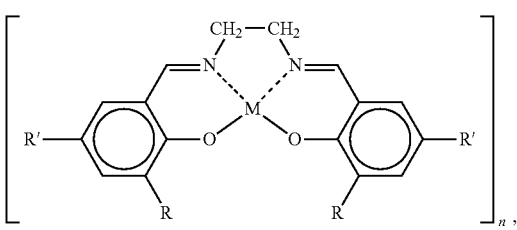

where M is a transition metal selected from the group of nickel, palladium, platinum, cobalt, copper, and iron;

Salen is the residue of bis(salicylaldehyde)ethylenediamine in the Schiff base;

R is a substituent in the Schiff base selected from the group of H, $CH_3O-$, $C_2H_5O-$, $HO-$, or $-CH_3$;

R' is a substituent in the Schiff base selected from the group of H or any of the halogens, n is the degree of polymerization, having a value up to 200000.

In addition the polymer complex compound of a transition metal with a Schiff base can be a compound of the poly-[M(R,R'-Saltmen)] type, which has the structure

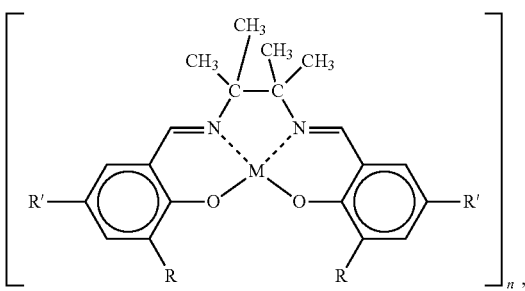

where M is a transition metal selected from the group of nickel, palladium, platinum, cobalt, copper, and iron;

Saltmen is the residue of bis(salicylaldehyde)tetramethylethylenediamine in the Schiff base;

R is a substituent in the Schiff base selected from the group of H, $CH_3O-$, $C_2H_5O-$, $HO-$, or $-CH_3$;

R' is a substituent in the Schiff base selected from the group of H or any of the halogens, n is the degree of polymerization, having a value up to 200000.

In addition, the polymer complex compound of a transition metal with a Schiff base may be a compound of the poly-[M(R,R'-Salphen)] type, which has the following structure

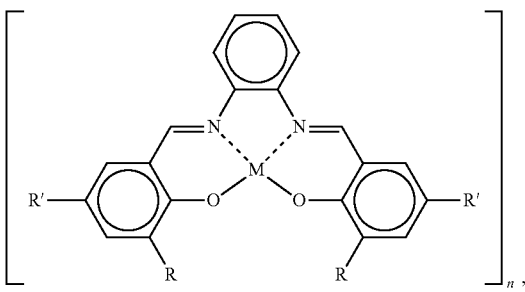

where M is the transition metal selected from the group of nickel, palladium, platinum, cobalt, copper, and iron;

Salphen is the residue of bis(salicylaldehyde)-o-phenylenediamine in the Schiff base; R is a substituent in the Schiff base selected from the group of H, $CH_3O-$, $C_2H_5O-$, $HO-$, or $-CH_3$;

R' is a substituent in the Schiff base selected from the group of H or any of the halogens, n is the degree of polymerization, having a value up to 200000.

Another object of the invention is a metal-air current source comprising a cathode as described above and an anode made of material comprising at least one chemically active metal, the anode and cathode being separated by an electrolyte having ions of said chemically active metal contained in the anode.

The material from which the anode of the metal-air current source is made can be alkali metal, rare earth metal, or transition metal. Such metals have negative electrode potential so that they are preferably used as anode material.

In particular lithium, which has the most negative electrode potential, can be used as the alkali metal. The electrolyte in this current source with a lithium anode can be, for example, a solution of lithium trifluoromethanesulfonate in tetraethylene glycol dimethyl ether with a molar ratio of these components of about 1:2 to 1:8, preferably 1:4. The range is determined by the solubility of the lithium trifluoromethanesulfonate salt in the tetraethylene glycol dimethyl ether solvent. The choice of electrolyte is determined by the fact that it ensures high ionic conductivity and is stable within a wide range of voltages (area of electrochemical stability), apart from which lithium does not chemically react with it, which precludes self-discharge of a lithium-air current source with such an electrolyte.

In addition an alloy comprising one or several chemically active metals can be used as the material from which the anode is made. In particular a lithium-silicon alloy, lithium-aluminum alloy, lithium-tin alloy, or a lead-sodium alloy can be used. Said alloys have sufficient negative electrode potential and at the same time provide for higher thermodynamic (corrosion) resistance and mechanical strength of the anode.

BRIEF DESCRIPTION OF DRAWINGS

The invention is explained by the following graphic materials.

FIG. 1 and FIG. 2, as an example of implementation of this invention, schematically present the structure of a lithium-air current source comprising a lithium anode and a cathode in the form of a carbon base with an applied polymer complex compound of a transition metal (cobalt) with a Schiff base, and the process of discharge of such a current source is illustrated. The state of the lithium-air current source at the beginning of the discharge process is shown in FIG. 1, while FIG. 2 shows its state at the end of the discharge process.

FIG. 3(a) shows its graphic formula and FIG. 3(b) a symbolic representation of said polymer fragment according to its spatial orientation.

FIG. 6(a) shows the graphic formula of said polymer fragment, and FIG. 6(b) illustrates such interaction when interacting lithium ions and a polymer fragment are in the corresponding spatial orientation.

IMPLEMENTATION OF INVENTION

Figure 1:
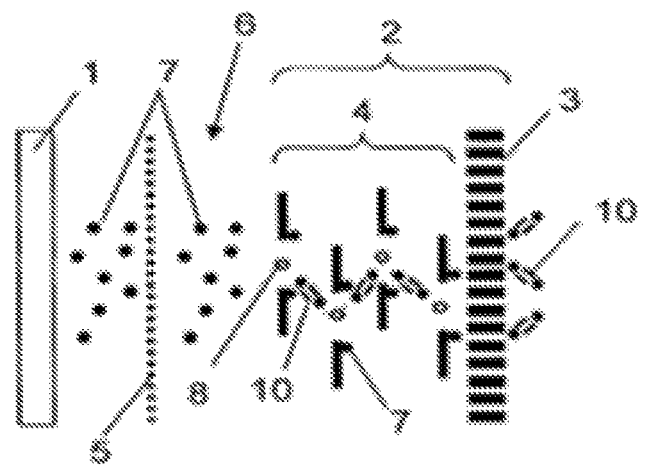
Figure 2:
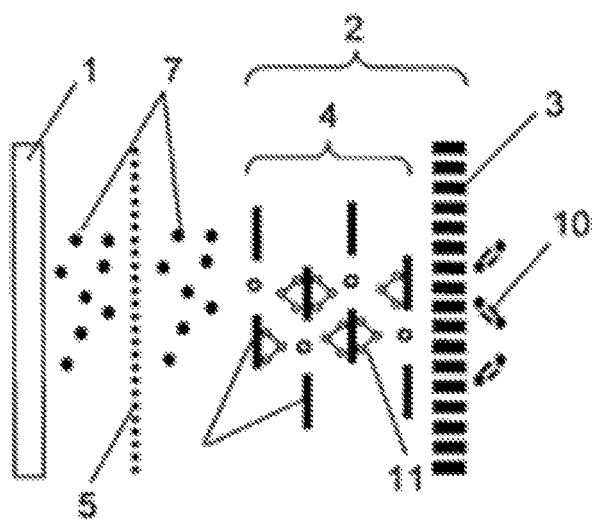

A possibility of implementation of this invention is shown below using as an example a lithium-air current source (FIGS. 1 and 2) comprising a lithium anode 1 and a cathode 2, which comprises a base 3 of a porous, electrically conductive material permeable to molecular oxygen with an applied coating 4 of a polymer complex compound of a transition metal (cobalt) with a Schiff base of the poly-[Co (Schiff)] type. The anode 1 and cathode 2 are separated mechanically by the separator 5 and electrochemically by the electrolyte 6, which contains lithium ions 7.

The polymer coating 4 of the cathode 2 can be applied by means of electrochemical polymerization, for example, by electrochemical oxidation of the monomer [Co(Salen)] on the surface of the base 3 of a porous carbon material permeable to molecular oxygen at a potential of 1.05 V in relation to a standard silver/silver chloride electrode in a deaerated acetone solution comprising $10^{-3}$ mol/l of said monomer and 0.1 mol/l of tetraethyl ammonium tetrafluoroborate for approximately 10 to 30 min. The material of the base 3 can be material containing Carbon Super PR brand carbon manufactured by TIMCAL.

Investigations that were carried out, including by one of the authors of this invention, demonstrated that polymer complex compounds of a transition metal with a Schiff base have a specific stacked structure with polymer fragments bound to each other through donor-acceptor interactions between the metallic center of one polymer fragment and the ligand of another polymer fragment [I. E. Popeko, V. V. Vasiliev, A. M. Timonov, G. A. Shagisultanova. Electrochemical Behaviour of Palladium (II) Complexes with Schiffs Bases, Synthesis of Mixed-Valent Pd(II)—Pd(IV) Complexes//Russian J. Inorg. Chem. 1990, V. 35, N 4, P. 933].

Figure 3:
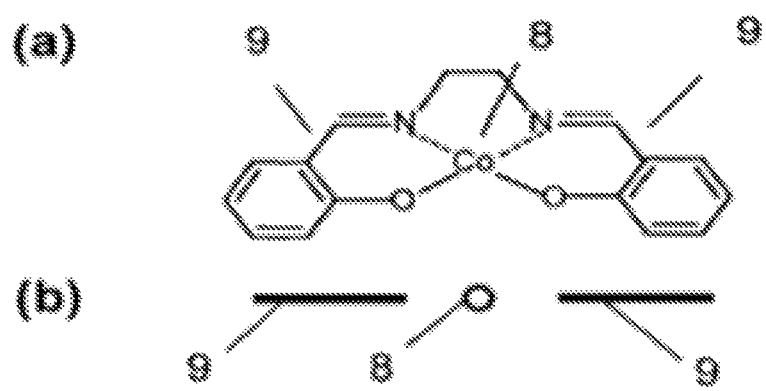
FIG. 3 provides a symbolic representation of the polymer fragment poly-[Co(Schiff)] in accordance with the invention.
Figure 4:
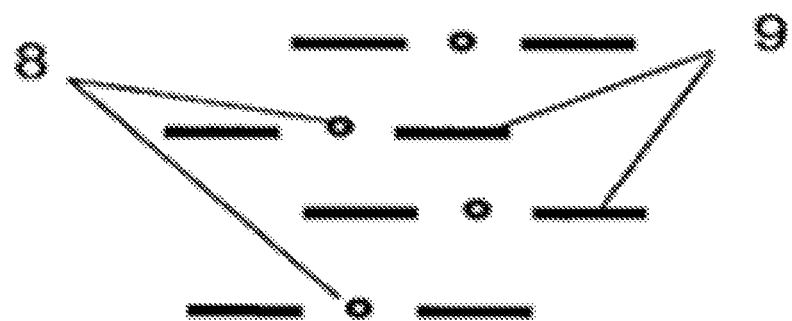
FIG. 4 is a symbolic representation of the spatial stacked structure of polymer poly-[M(Schiff)], in particular poly-[Co(Schiff)].

FIG. 3 provides a symbolic representation of the polymer fragment poly-[Co(Schiff)], which comprises a metallic center 8 and a ligand environment (ligand) 9. In this example, cobalt Co is the metallic center 8 and Salen is the ligand 9. In FIG. 4 a symbolic representation of a spatial stacked structure of [Co(Schiff)] polymer is given in which the polymer fragments are disposed in parallel, one after the other, so that the metallic center 8 is disposed directly above and below the ligands 9 of the adjacent fragments, which is required for said alignment of polymer fragments in the form of a stacked structure due to donor-acceptor interaction.

Figure 5:
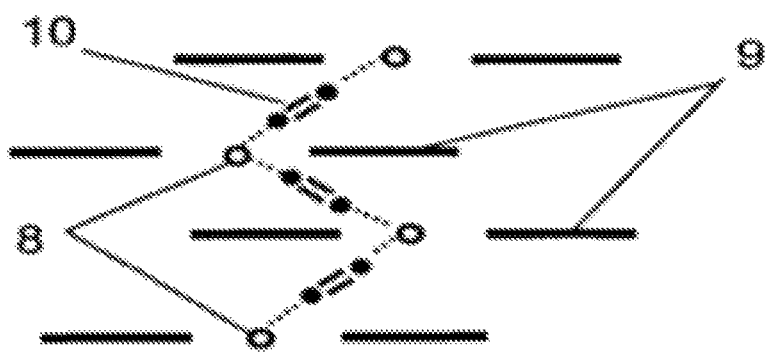
FIG. 5 is a symbolic representation of the interaction of molecular oxygen with a polymer in accordance with this invention.

The possibility of achieving the above-mentioned result, related to the energy parameters of the current source under consideration, is related to the properties of polymer complex compounds of transition metal with a Schiff base, discovered as a result of investigations by the authors of the present invention. The polymer complex compounds, for example, of the poly-[Co(Schiff)] type, have a strong chemical affinity to molecular oxygen. In the air environment, such polymers are capable of interaction with molecular oxygen due to formation of bridges of the "metal-oxygen-metal" type between metallic centers [El-Ichiro Ochiai. Electronic structure and oxygenation of bis(salicylaldehyde)ethylene-diimino cobalt (II)//J. Inorg. Nucl. Chem. 1973. V. 35. P. 1727]. This interaction of molecular oxygen 10 with metallic centers 8 of polymer fragments is shown in FIG. 5.

It was demonstrated that the oxygen concentration in the polymer is approximately 500 times greater than in the air, and this polymer-bound oxygen has a longer and therefore weaker bond between atoms of oxygen than does a molecule of free molecular oxygen. This means that the bound oxygen was converted to a more active state due to the action of the poly-[Co(Schiff)] polymer, which acted in this system as a catalyst.

Let us examine discharge/charge processes of the current source according to this invention.

Discharge Process.

Figure 6:
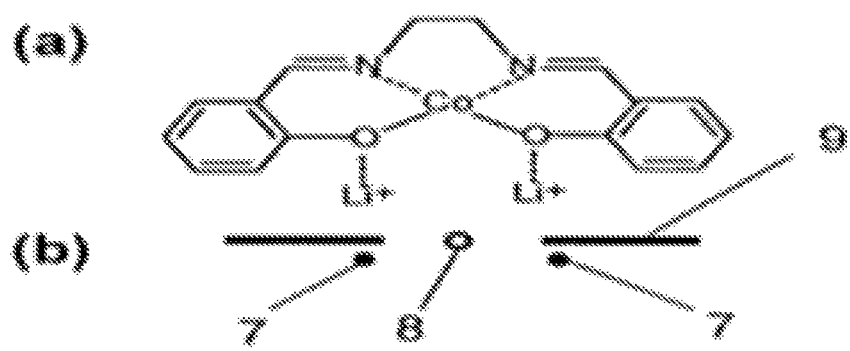
FIG. 6 is a graphic representation of the interaction of lithium ions with polymer fragment poly-[Co(Schiff)], where

In the process of discharge of the lithium-air current source (see FIG. 1), the lithium anode 1 is oxidized with formation of lithium ions 7 which start to move in the direction of the cathode 2. In addition, lithium ions 7 are attracted to the polymer coating 4 of the cathode 2 by oxygen atoms of the ligand 9, as is illustrated in FIG. 6. FIG. 6(a) shows a graphic formula of the polymer fragment, and FIG. 6(b) illustrates such interaction when lithium ions 7 are attracted to negatively charged oxygen atoms of the ligand 9 of the polymer fragment. An excess of electrons in the polymer coating 4 of cathode 2 results in the reduction of the bound oxygen 10. The reduction products are stabilized by lithium ions 7 in the form of lithium oxide or peroxide 11 (see FIG. 2).

The described oxygen reduction reaction is very fast, because the reduced oxygen and lithium ions are concentrated in the same reaction zone of the polymer fragment in close proximity to one another, which facilitates the chemical interaction between lithium and oxygen, resulting in the formation of lithium oxide. The reduction catalysts that are usually used as a rule adsorb and concentrate only one reagent, which usually is oxygen. The polymer complex of the transition metal, demonstrating catalytic properties when used in this invention, "attracts" reagents-lithium ions and oxygen. The discharge process is completed after the whole cathode surface is covered with a thin layer of discharge products.

Charge Process

In the process of charging the current source, carried out according to this invention, as a result of application of the positive electric potential to the cathode 2 in relation to the anode 1, the metallic centers 8 of fragments of the polymer coating 4 become oxidized and are converted to a +3 oxidation state. The metallic centers, in this case cobalt atoms, in this oxidized state are strong oxidizing agents capable of oxidizing the lithium oxide back to molecular oxygen, which leaves the reaction zone and exits into the atmospheric environment through the porous carbon material of the base 3 of the cathode 2. In this case, the polymer coating 4 acts as an electrochemical catalyst; it remains in the oxidized state due to positive potential applied to the cathode 2 from the external power source. Lithium ions 7 diffuse back to the lithium anode 1, where they are reduced to metallic lithium.

In the described charge process, the polymer coating of the cathode remains stable over the entire range of operating potentials; no irreversible changes occur in the polymer structure. As a result of charging of the lithium-air current source under consideration, lithium oxide (peroxide) transforms back into oxygen and lithium ions, and the cathode surface is freed of said products formed in the process of discharge of the current source. All this together makes it possible to significantly increase the number of charge-discharge cycles of the current source in comparison with the known ones.

Thus high operating characteristics of the lithium-air current source in accordance with this invention are achieved due to the following circumstances.

Higher specific discharge power is achieved due to a higher rate of oxygen reduction and higher rate of oxygen diffusion through the polymer coating of the cathode.

In accordance with this invention, a longer service life and higher charge-discharge efficiency of the lithium-air current source are achieved due to great reversibility of chemical and electrochemical transformations taking place on the surface of polymer coating of its cathode, and due to absence of irreversible processes in it, related to blocking of the operating (active) surface of the cathode by nonconductive and insoluble crystals of lithium oxide or peroxide.

Example 1

Manufacture of Electrodes and Current Source.

During manufacture of the cathode, the carbon material (Super P, 80% by weight, manufactured by TIMCAL) and polyvinylidene fluoride (PVDF, 20% by weight) as a binder were directly mixed in N-methyl-2-pyrrolidone solvent, after which the slurry that was obtained was applied to a gas permeable layer made of carbon nonwoven material manufactured by Hollingworth & Vose Company, product 8000030, with an application density of 1.0±0.1 mg/cm². After this the blank was dried for 12 hours at 100° C. in vacuum until the solvent residues were removed. Thus the base of the future cathode was obtained. Then the poly-[Co(Saltmen)] coating was applied to the cathode base in the form of a film. The application process was completed in a sealed, argon-filled glovebox with a total water and oxygen concentration of less than $10^{-5}$%. The process of polymerization was performed in an acetonitrile solution containing 1 mmol/l of [Co(Saltmen)] monomer and 0.1 mol/l of tetraethylammonium tetrafluoroborate $(C_2H_5)_4NBF_4$, and included two cycles with alternation of the potential from 0 to 1.4 V in relation to a silver/silver chloride electrode at a rate of 50 mV/s.

The anode was made of 700 μm-thick lithium foil. The current source was assembled in an R2032 steel cell case (coin-type). In the cathode casing, which is a current lead, 21 holes were made with a diameter of 1 mm to allow oxygen access to the cathode. The cathode and anode were separated by a porous paper separator. The lithium-containing electrolyte was a solution of lithium trifluoromethanesulfonate $LiCF_3SO_3$ (manufactured by Aldrich) in tetraethylene glycol dimethyl ether (TEGDME) at a 1:4 molar ratio of the components.

The current source was subjected to charging and discharging on a CT-3008W testing unit from NEWARE (PRC). The dc charge/discharge current was 100 μA, which corresponded to a current density of 35 $\mu A/g_{carbon}$ in the cathode. During the testing, the current source was placed in a container filled with oxygen under a pressure approximately 10% higher than atmospheric pressure.

Figure 7:
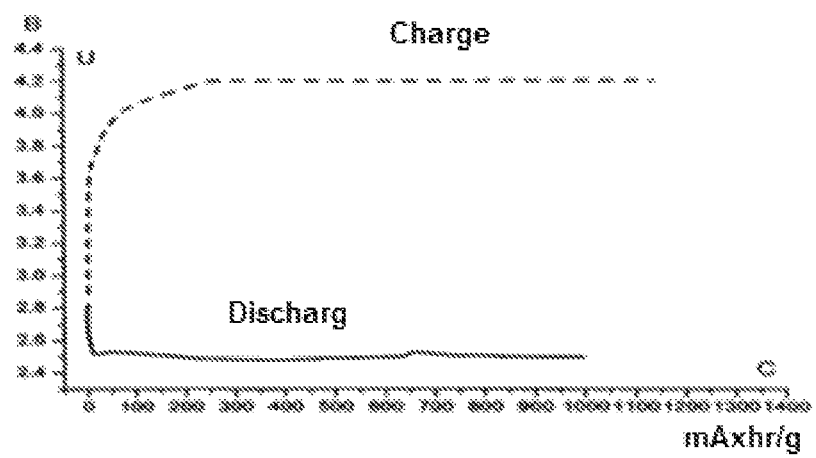
FIG. 7 depicts the charge-discharge curves of the current source described in one exemplary embodiment of the invention.

The charge-discharge curves of the current source, described in Example 1, are shown in FIG. 7, which indicates that the specific discharge capacity C of the current source is 1000 $\mu A/g_{carbon}$ in the cathode, and the average voltage U at discharge is 2.5 V. The results obtained correspond to the following characteristics of the current source:

specific energy—2000 Wh/kg (per weight of electrodes);
specific power—70 W/kg (per weight of electrodes);

Example 2

Manufacture of Electrodes and Current Source.

During manufacture of the cathode, carbon material (Super P, 80% by weight, made by TIMCAL), and polyvinylidene fluoride (PVDF, 20% by weight) as a binder were directly mixed in the solvent N-methyl-2-pyrrolidone, after which the slurry that was obtained was applied to the gas permeable layer made of a stainless steel mesh with an application density of 0.4±0.1 mg/cm². After that the blank was dried for 12 hours at 100° C. in a vacuum until removal of the solvent residues. Thus the base of the future cathode was obtained. Then a poly-[Co(Saltmen)] coating in the form of a film was applied to the base of the cathode. The application process was performed in a sealed argon-filled glovebox with a total concentration of water and oxygen of less than $10^{-5}$%. The process of polymerization was conducted in an acetonitrile solution containing 1 mmol/l of monomer [Co(Saltmen)], and 0.1 mol/l of tetraethylammonium tetrafluoroborate $(C_2H_5)_4NBF_4$, and included two cycles with alternation of the potential from 0 to 1.4 V in relation to a silver/silver chloride electrode at a rate of 50 mV/s.

The anode was made of 700 μm thick lithium foil. The current source was assembled in a steel casing of the R2032 type (coin-type). In a cathode casing acting as a current lead, 21 holes with a diameter of 1 mm were made to allow oxygen access to the cathode. The cathode and anode were separated by a porous paper separator. The lithium-containing electrolyte was a solution of lithium trifluoromethanesulfonate $LiCF_3SO_3$ (manufactured by Aldrich) in tetraethylene glycol dimethyl ether (TEGDME) with a 1:4 molar ratio of the components.

In addition a control current source was made that differed from the described experimental source made in accordance with this invention only in that its cathode did not have the said poly-[Co(Saltmen)] polymer coating.

Both current sources (experimental and control) were tested under the same charge-discharge conditions on a CT-3008W unit from the NEWARE Company (PRC). DC charge current was 100 μA, which corresponded to a current density of 35 mA per g of carbon in the cathode. In the process of testing, both current sources were in an air atmosphere at room temperature.

Figure 8:
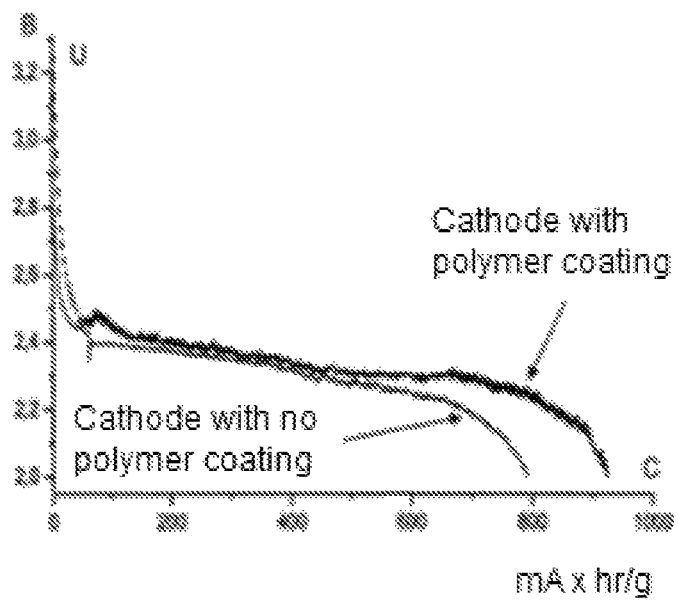
FIG. 8 depicts the discharge curves of the current sources described in another exemplary embodiment of the invention.

FIG. 8 shows the experimentally obtained discharge curves for the control and experimental current sources. It is evident that the specific discharge capacity C of the experimental current source is about 920 mAh per g of carbon in the cathode, and the average voltage U at discharge was 2.31 V. Here the specific discharge capacity C of the control current source was about 780 mAh per g of carbon in the cathode, and the average voltage U at discharge was 2.25 V. It is evident that use of a cathode with a polymer coating in the lithium-air current source according to this invention provides a higher discharge voltage and higher specific discharge capacity. The results obtained correspond to the following characteristics of the current source made in accordance with this invention:

specific energy—1550 Wh/kg (per weight of electrodes);
specific power—300 W/kg (per weight of electrodes).

Despite the fact that the results cited in the examples were obtained from using polymer complexes of cobalt with a Schiff base in the current source, similar results can also be obtained from the use of other polymer metal complexes with Schiff bases, for example, complexes of nickel, manganese, and other transition metals.

Thus the results of the experiments confirm that the use in metal-air current sources of a cathode whose operating surface has a coating of a polymer complex compound of a transition metal with a Schiff base results in higher specific electrical characteristics of these current sources in comparison with systems for the same purpose known from the prior art. This is because these polymers, as disclosed by the inventors, act in this system as cathode reaction catalysts.

The invention claimed is:

1. A metal-air current source comprising a cathode, and an anode made of material comprising at least one chemically active metal, which is contained in the anode;
   an electrolyte between the anode and the cathode, the electrolyte containing ions of the chemically active metal of the anode;
   wherein the cathode comprises
      a base made of porous electroconducting material having an oxygen-receiving surface and an operating surface, the operating surface having applied thereon a polymer complex compound of a transition metal with a Schiff base, having a stacked structure in which separate fragments of said polymer compound are bound to one another by donor-acceptor interaction, wherein each fragment acts as a highly efficient reaction center capable of concentrating the molecular oxygen coming through the porous cathode base, and metal ions coming from the electrolyte.

2. The metal-air current-source according to claim 1, in which porous carbon material with a developed surface is used as the material of the base.

3. The metal-air current-source according to claim 1, in which the polymer complex compound of a
   transition metal with a Schiff base is a compound of the poly-[M(R,R'-Salen)] type, which has the following structure

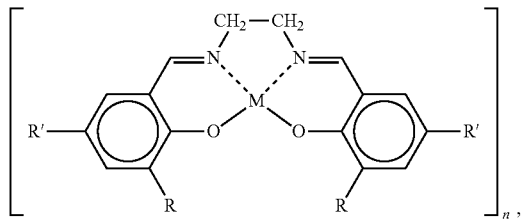

where M is a transition metal selected from the group of nickel, palladium, platinum, cobalt, copper, and iron;
Salen is the residue of bis(salicylaldehyde)ethylenediamine in the Schiff base;
R is a substituent in the Schiff base, selected from the group of H, $CH_3O$—, $C_2H_5O$—, HO— or —$CH_3$;
R' is a substituent in the Schiff base selected from the group of H or any of the halogens;
n is the degree of polymerization, having a value up to 200000.

4. The metal-air current-source according to claim 1, where the polymer complex compound of a transition metal with a Schiff base is a compound of the poly-[M(R,R'-Saltmen)] type, having the following structure

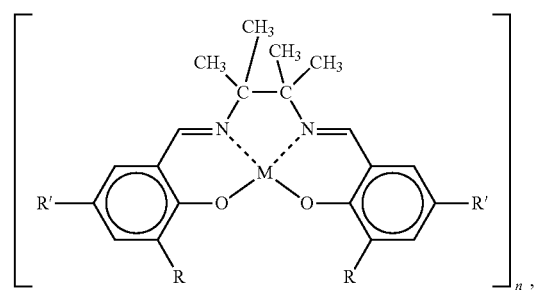

where M is a transition metal selected from the group of nickel, palladium, platinum, cobalt, copper, and iron;
Saltmen is the residue of bis(salicylaldehyde) tetramethylethylenediamine in the Schiff base;
R is a substituent in the Schiff base, selected from the group of H, $CH_3O$—, $C_2H_5O$—, HO— or —$CH_3$;
R' is a substituent in the Schiff base, selected from the group of H or any of the halogens, n is the degree of polymerization, having a value up to 200000.

5. The metal-air current-source according to claim 1, in which the polymer complex compound of a transition metal with a Schiff base is a compound of the poly-[M(R,R'-Salphen)] type having the following structure,

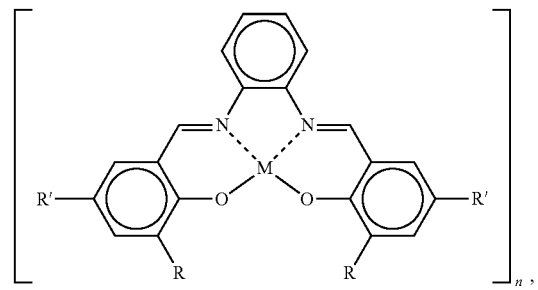

where M is a transition metal selected from the group of nickel, palladium, platinum, cobalt, copper, and iron;
Saltmen is the residue of bis(salicylaldehyde)-o-phenylenediamine in the Schiff base;
R is a substituent in the Schiff base, selected from the group of H, $CH_3O$—, $C_2H_5O$—, HO— or —$CH_3$;
R' is a substituent in the Schiff base, selected from the group of H or any of the halogens,
n is the degree of polymerization, having a value up to 200000.

6. The metal-air current-source according to claim 1, in which an alkali metal, rare earth metal, or transition metal is used as the material from which the anode is made.

7. The metal-air current-source according to claim 6, in which lithium is used as said alkali metal.

8. The metal-air current-source according to claim 7, in which the electrolyte is a solution of lithium trifluoromethanesulfonate in tetraethylene glycol dimethyl ether with a molar ratio of these components of approximately 1:2 to 1:8.

9. The metal-air current-source according to claim 8, in which the ratio of said components of the electrolyte is 1:4.

10. The metal-air current-source according to claim 1 in which the material from which the anode is made is an alloy comprising one or several chemically active metals.

11. The metal-air current-source according to claim 10, in which said alloy is a lithium-silicon alloy, lithium-aluminum alloy, lithium-tin alloy, or lead-sodium alloy.

* * * * *